US 10,558,550 B2

(12) United States Patent
Malton et al.

(10) Patent No.: US 10,558,550 B2
(45) Date of Patent: Feb. 11, 2020

(54) STATIC PROGRAM ANALYSIS OF A PARTIAL SOFTWARE PROGRAM

(71) Applicant: BlackBerry Limited, Waterloo (CA)

(72) Inventors: Andrew James Malton, Waterloo (CA); Andrew Walenstein, Issaquah, WA (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 15/809,676

(22) Filed: Nov. 10, 2017

(65) Prior Publication Data
US 2019/0146897 A1 May 16, 2019

(51) Int. Cl.
G06F 11/36 (2006.01)
G06F 21/57 (2013.01)

(52) U.S. Cl.
CPC ........ G06F 11/3608 (2013.01); G06F 21/577 (2013.01); G06F 2221/033 (2013.01)

(58) Field of Classification Search
CPC ............ G06F 11/3604; G06F 11/3457; G06F 11/3624
USPC ....................................................... 717/124
See application file for complete search history.

(56) References Cited

U.S. PATENT DOCUMENTS

| | | | | |
|---|---|---|---|---|
| 7,743,423 | B2 * | 6/2010 | Lange | G06F 21/53 713/193 |
| 8,869,286 | B1 | 10/2014 | Liu | |
| 9,256,512 | B1 * | 2/2016 | Shiraishi | G06F 11/3604 |
| 2005/0081104 | A1 * | 4/2005 | Nikolik | G06F 11/3676 714/38.13 |
| 2005/0108562 | A1 * | 5/2005 | Khazan | G06F 11/3604 726/23 |
| 2005/0210275 | A1 * | 9/2005 | Homing | G06F 21/14 713/190 |
| 2008/0307397 | A1 * | 12/2008 | Angell | G06F 9/455 717/131 |

(Continued)

OTHER PUBLICATIONS

"Burgstller et al" ;"A symbolic analysis framework for static analysis of imperative programming languages";"22 pages" (Year: 2012).*

(Continued)

Primary Examiner — Wei Y Zhen
Assistant Examiner — Brahim Bourzik
(74) Attorney, Agent, or Firm — Fish & Richardson P.C.

(57) ABSTRACT

A method for analyzing a partial software program includes receiving a first software program. The first software program is designed to execute using a second software program. A first symbolic value indicates a characteristic of the second software program. The first software program is analyzed using a static program analysis, where the static program analysis generates a second symbolic value based on the first symbolic value. The second symbolic value indicates a characteristic of the first software program. The first software program is analyzed independent of an availability of the second software program. In response to determining that the second symbolic value is associated with a predetermined characteristic and that the first software program would perform an action associated with the second symbolic value if the first software program was executed using the second software program, a warning signal is generated.

18 Claims, 2 Drawing Sheets

(56) References Cited

U.S. PATENT DOCUMENTS

| | | | |
|---|---|---|---|
| 2009/0019427 A1* | 1/2009 | Li | G06F 11/3676 |
| | | | 717/126 |
| 2010/0162217 A1* | 6/2010 | Morrison | G06F 11/3604 |
| | | | 717/129 |
| 2010/0242029 A1* | 9/2010 | Tkachuk | G06F 11/3696 |
| | | | 717/135 |
| 2011/0145650 A1* | 6/2011 | Krauss | G06F 11/3604 |
| | | | 714/38.1 |
| 2011/0154300 A1* | 6/2011 | Rao | G06F 11/3624 |
| | | | 717/133 |
| 2012/0084759 A1* | 4/2012 | Candea | G06F 11/3612 |
| | | | 717/126 |
| 2013/0086561 A1* | 4/2013 | Pistoia | G06F 8/43 |
| | | | 717/132 |
| 2013/0097706 A1* | 4/2013 | Titonis | G06F 21/56 |
| | | | 726/24 |
| 2013/0152154 A1 | 6/2013 | Xiao | |
| 2013/0219057 A1* | 8/2013 | Li | G06F 8/443 |
| | | | 709/224 |
| 2014/0047538 A1* | 2/2014 | Scott | G06F 11/3604 |
| | | | 726/22 |
| 2015/0363305 A1* | 12/2015 | Guan | G06F 11/3688 |
| | | | 717/132 |

OTHER PUBLICATIONS

Extended European Search Report issued in European Application No. 18205375.1 dated Jan. 23, 2019, 10 pages.

Anonymous, "Symbolic execution," Retrieved from URL <https://en.wikipedia.0rg/w/index.php?ti tle=Symbolic_executi on&oldi d=808290873>, [retrieved on Jan. 15, 2019], available on or before Nov. 2, 2017, 6 pages.

Anonymous, "Concolic testing," Retrieved from URL <https://en.wi ki pedi a.org/w/i ndex.php?ti tle=Concoli c_testing&oldi d=80147818>, [retrieved on Jan. 15, 2019], available on or before Sep. 19, 2017, 5 pages.

Yang et al., "AppIntent," Computer & Communications Security, Nov. 4, 2013, 12 pages.

PCT International Search Report and Written Opinion in International Appln. No. PCT/US2018/059398, dated Jan. 23, 2019, 16 pages.

* cited by examiner

STATIC PROGRAM ANALYSIS OF A PARTIAL SOFTWARE PROGRAM

TECHNICAL FIELD

The present disclosure relates to static program analysis of software programs.

BACKGROUND

Static program analysis is a technique for automatically analyzing computing properties or behaviors of a software program without actually compiling and executing the software codes. A mathematical model of an execution of the software program can be constructed by a static program analyzer, and the mathematical model can provide information about the execution of the software program.

DESCRIPTION OF DRAWINGS

Like reference numbers and designations in the various drawings indicate like elements.

DETAILED DESCRIPTION

Software programs can be analyzed by static program analysis to predict whether the software programs have flawed behaviors, such as behaviors indicating security flaws or other flaws. For example, mobile apps (also known as applications) to be installed on mobile devices can be analyzed to identify potential security flaws contrary to security policies. One example of a security flaw is transmitting private data (e.g., personally identifiable information (PII)) from a device to an unauthorized remote site or device. Another example of a security flaw is storing private data on a device in such a way as to expose the private data to access by other unauthorized software programs. Static program analysis techniques can determine behaviors of a software program by examining software codes (without executing the software codes), following algorithms grounded in mathematical logic, proof theory, and formal semantics.

In some cases, static program analysis can be applied to a partial software program, that is, when some parts of the software program cannot be included in the static program analysis. This may be because some parts are too big or complicated to analyze, inaccessible for technical or intellectual property reasons, or missing parts have not been written yet. As a result, behaviors of the missing parts are by hypothesis unavailable. For including behaviors of the missing parts, the static program analysis can choose between "over-approximation" (assuming many possible behaviors of the missing parts in order to omit none) and "under-approximation" (adopting necessary behaviors of the missing parts in order to avoid drawing false conclusions). In some cases, over-approximation can cause false positives where the static program analysis predicts a flaw that does not exist, while under-approximation can miss a flaw that actually exists.

At a high level, the described approach describes a static program analyzer for analyzing a partial software program. The described static program analyzer can be a software tool or a program routine for automatically predicting behaviors of the partial software program by simulating the execution of the partial program. For example, when analyzing a mobile app, software codes of the app are available for analysis, while software codes of an underlying platform (e.g., an operating system) or library functions supporting the app may not be available for analysis. In these cases, the static program analyzer can consider the mobile app as a partial software program, treating the underlying platform, the library functions, as well as user actions, and inputs and output as "missing parts".

The described approach analyzes the partial software program using both a concrete computation and a symbolic computation. For including behaviors of the missing parts in the static analysis, the described approach uses the concrete computation for the software codes that are available while the symbolic computation for the missing parts. The symbolic computation can construct symbolic data that represent the missing parts' behaviors in the absence of codes for the missing parts. The concrete computation can construct ordinary non-symbolic concrete data values (e.g., bit patterns of registers or memories) using the actual codes available. When the analysis switches between the symbolic computation and the concrete computation, the symbolic data can be carried into the concrete computation. Computation results of the static analysis can be a mixture of symbolic values and concrete non-symbolic values. Symbolic data or a symbolic value of the symbolic data can include symbol names for concrete data values.

The static program analyzer can simulate an execution of the partial program (e.g., the mobile app) using symbolic values to represent behaviors of the missing parts. For example, when the static program analyzer interprets the codes of the mobile app line by line, based on instructions in the codes, the static program analyzer can update contents of registers or memories associated with the mobile app. If the static program analyzer detects that the mobile app can export contents of registers or memories that include predetermined values related to security flaws (e.g. PII), the static program analyzer can generate a warning signal.

In some cases, if the codes of the mobile app include conditional branches, the static program analyzer can generate multiple threads, each thread corresponding to a conditional branch. The static program analyzer simulates an execution of each thread. For reducing over-approximation, the static program analyzer can stop the execution of a thread if contents of the registers or memories corresponding to that thread have no more updates or an amount of updating is below a threshold. In some cases, when content of a register or memory (e.g., the computation result of a mix of symbolic values and concrete values) becomes too large (e.g., a size of the content exceeds a threshold), the content of the register or memory can be replaced by a generic data value (e.g., a generic symbolic value).

Figure 1:
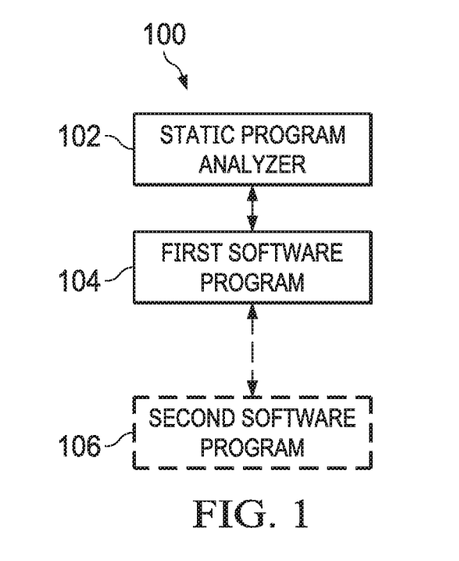
FIG. 1 illustrates an example system for analyzing a partial software program, according to an implementation.

FIG. 1 illustrates an example system 100 for analyzing a partial software program, according to an implementation. The example software analyzing system 100 can include a static program analyzer 102, a first software program 104, and a second software program 106. The static program analyzer 102 can be a software tool or a program routine for automatically analyzing software programs. The first software program 104 is executed using the second software program 106. For example, the first software program 104 is a mobile app, the second software program 106 is an operating system or library functions, and the mobile app is designed to execute on the operation system or use the library functions. Software codes of the first software program 104 are provided to the static program analyzer 102, while software codes of the second software program 106 are not available to the static program analyzer 102 (therefore the second software program 106 is represented by dashed lines). As a result, the static program analyzer 102 considers the first software program 104 as a partial software program, because functionalities of the first software program 104 are not complete without functionalities of the second software program 106. In some cases, the software codes of the first software program 104 can be executable codes, object codes, source codes, machine language codes, assembly language codes, or other type of codes.

In some cases, the static program analyzer 102 is used to analyze certain characteristics of the first software program 104, for example, whether the first software program 104 has particular security flaws. Although the software codes of the second software program 106 are not available for analysis, behaviors of the second software program 106 related to analyzing the particular security flaws can be provided to the static program analyzer 102, for example, using symbolic values.

In operation, the first software program 104 can be received. The first software program 104 is designed to execute using the second software program 106. A first symbolic value indicates a characteristic of the second software program 106. The first software program 104 can be analyzed using a static program analysis, where the static program analysis generates a second symbolic value based on the first symbolic value. The second symbolic value indicates a characteristic of the first software program 104. The first software program 104 can be analyzed independent of an availability of the second software program 106. In response to determining that the second symbolic value is associated with a predetermined characteristic and that the first software program 104 would perform an action associated with the second symbolic value if the first software program 104 was executed using the second software program 106, a warning signal can be generated.

In some cases, the first software program 104 is in a machine language format. The first software program 104 can include an application, and the second software program 106 can include at least a portion of an operating system. The first software program 104 can be associated with a register, and the second symbolic value can be stored in the register. The action associated with the second symbolic value can be exporting the second symbolic value in the register to an entity different than the first software program. In some cases, the static program analysis can generate a plurality of threads, each of the plurality of thread corresponding to a conditional branch of the first software program 104. Analyzing the first software program 104 can include updating the second symbolic value, and an analysis of a thread can be continued until the updating stops. The static program analysis can include a symbolic computation and a concrete computation. The predetermined characteristic of the first software program 104 can be a security characteristic.

The static program analysis described herein improves software analyzing techniques so that a partial software program can be analyzed even though some parts of the software program are not available. Computation results from the combination of the symbolic computation and the concrete computation can be precise when possible and imprecise when necessary. Mixed computation with symbolic and concrete results can allow the precision to be carried forward into the symbolic domain, where imprecision is expected. In effect, the described approach examines a degree of over-approximation to avoid excessive false positives. When computing with imprecise symbolic results, the described approach can approximate terminations of threads of the software program to avoid producing too much imprecision to be useful for predicting behaviors of the partial software program. The described approach explores a degree of imprecision to determine when to abandon a thread due to lack of precision. For example, when the computation results become too large without new updates, the described approach can consider that further analysis of the thread is not useful because of over-approximation or imprecision, and abandon the thread.

In some implementations, the first software program 104 is a machine language program in a binary form for advanced reduced instruction set computer (RISC) machine (ARM) processors. The machine language can be in an executable and linkable format (ELF). In some cases, the static program analyzer 102 can start an analysis of the first software program 104, step by step, from a starting or entry point of the codes of the first software program 104 (e.g., an entry point as recorded in an ELF file). The static program analyzer 102 can also start the analysis anywhere within the codes of the first software program 104.

The static program analyzer 102 can analyze or interpret each line of the codes of the first software program 104 by maintaining a current state of the first software program 104. For example, a state can include contents of all or a subset of registers or memories related to the first software program 104 (e.g., registers or memories of a simulated ARM processor). Each line of the codes of the first software program 104 (e.g., a machine instruction) can change the state, for example, changing either the register contents or the memory contents, or both. The static program analyzer 102 can update and record the contents of the registers or memories. For an example, a machine instruction of "add 1" applied to a register which has a concrete value of 10, changes the current state of that register to 11. In some cases, content of a register or memory can include the computation result of the symbolic computation and the concrete computation (e.g., the content can be a mix of symbolic values and concrete non-symbolic values).

For analyzing the first software program 104, the static program analyzer 102 can use a concrete computation for the first software program 104 and a symbolic computation for the second software program 106. Whenever a line of code or a machine instruction can be fully interpreted at a level of bits and arithmetical, the current state (values of registers or memories) of the first software program 104 remains "concrete". When the value of a register or the content of a memory is not known concretely, due to previous instructions or due to the missing second software program 106, subsequent lines of codes or machine instructions are interpreted symbolically instead of concretely. For example, an "add 1" instruction applied to a register whose value is known symbolically, e.g., by a symbolic name X, changes the current state in that register to X+1 literally. In other words, the symbolic data from the symbolic computation can be carried into the concrete computation. Usually the contents of memory and registers are initially symbolically unknown, except for the data that are explicitly present in the first software program 104. The static program analyzer 102 can simulate an execution of the first software program 104 using both symbolic values and concrete values.

The following is a simple example illustrating the concrete computation and the symbolic computation. For example, the first software program 104 has the following pseudo codes:

10 x=get (user ID from the operating system (i.e., second software program 106))

20 y=get (user password from the operating system)

30 if (a length of the character stringy is more than N)

40 concatenate (character string x, character string "000", character string y)

50 else 60 concatenate (character string x, character string "111", character string y)

The static program analyzer 102 can use the symbolic computation for analyzing lines 10 and 20, because the second software program 106 is not available. For example, behaviors of the second software program 106 can be represented by symbolic values UserID and Password, which are symbol names for any actual user ID and password. The symbolic values UserID and Password can be stored in registers or memories. The static program analyzer 102 can use a concrete computation for analyzing lines 30-60. For example, because of the if-else statement, two threads can be generated. The first thread corresponds to the conditional branch that the length of the character string y is more than N, and the current state corresponding to the first thread is UserID000Password. Similarly, the second thread corresponds to the conditional branch that the length of the character string y is less than or equal to N, and the current state of the second thread is UserID111Password. The static program analyzer 102 can maintain a current state for each thread.

In some implementations, when a particular line of code or a particular machine instruction of the first software program 104 transfers a code control (e.g., "branch to address" or "branch and link"), the current state at the control point corresponding to that particular line of code or that particular machine instruction is stored and maintained. When the code control passes that control point again, the recorded current state at that control point can be updated if the register contents or memory contents have changed. The current state can be considered as a logical summary of information associated with the first software program 104 when the control passes that control point. In some cases, the first software program 104 has multiple control points, and each control point has its own state updated and stored during the static analysis.

If the code control passes to a control point with new unsummarized information, the static program analyzer 102 can update the current state to include the new information, and continue to simulate the execution of the first software program 104. However, if the control passes to a control point with no new information (because the current state has already summarized the information or no change in the register contents or the memory contents) or an amount of the new information is below a threshold (e.g., an amount of change in the register contents or the memory contents is below a threshold), the static program analyzer 102 can stop analyzing the first software program 104 (or a thread of the first software program 104). In other words, the static program analyzer 102 can stop the analysis if no more information can be squeezed or extracted from the simulated symbolic execution.

In some cases, if the symbolic summary of information at a control point becomes too large, the static program analyzer 102 can replace the large symbolic summary with a general summary. For example, as the static program analyzer 102 continues to simulate the execution of the first software program 104, contents of some registers or memories may grow into a large size of symbolic data (or a long string of data including both symbolic values and concrete values) whose size exceeds a threshold which may cause the static analysis to be out of memory or slow down the static analysis significantly. In some cases, the contents of these registers or memories can be replaced by a generic symbolic value. In some instances, the static program analyzer 102 may eventually cease the analysis if further simulated execution of the first software program 104 does not change the generic symbolic value in the register or memory.

In some implementations, the first software program 104 can include conditional statements or instructions (e.g., "branch if not equal" depending on a previous comparison instruction or an if-else statement). If symbolic data without a concrete value is used to evaluate the condition (that is, the condition is known symbolically), all conditional branches can be possible depending on the concrete value of the symbolic data in a real execution of the first software program 104. As a result, the static program analyzer 102 can generate multiple threads, each thread corresponding to a possible conditional branch. The static program analyzer 102 can analyze each thread to determine if any thread has security flaws.

In some implementations, the code control of the first software program 104 is branched with return (e.g., subroutine call, or "branch and link") to an unknown or missing control point (e.g., the second software program 106), results of the static analysis are based on symbolic values reflecting behaviors of the second software program 106.

In some cases, certain values (symbolic or concrete) of the current state of the memories and registers that indicate a particular or predetermined characteristic (e.g., security flaw) of the first software program 104 can be flagged as private data. For example, certain symbolic values which security policy prohibits unauthorized export of can be flagged, such as symbolic values including symbol names for user ID, password, and/or PII. When detecting that the first software program 104 could export the flagged values to an unauthorized external device or an unauthorized software program, or detecting that the flagged values can be accessed by an unauthorized external device or an unauthorized software program, the static program analyzer 102 can generate a warning signal. The warning signal can be a signal to a different software tool (e.g. a logging tool) or a warning message presented to a user on a user interface. This warning indicates that the first software program 104 could possibly violate the security policy. For instance, a warning message can be logged if the first software program 104 exports the content of a register or a memory when the content includes symbolic names for user ID, password, and/or PII. In some implementations, the static program analyzer 102 can identify the registers or memories whose content would be exported by the first software program 104. For each identified register or memory, the static program analyzer 102 can determine whether the exported content can include one or more flagged values.

In some cases, because the current state represents an approximate summary of information, the warning message may not indicate a real security flaw. As a result, a user may further verify whether a security flaw exists by, for example, examining the first software program 104 using other tools, and the user's wits and experience.

Figure 2:
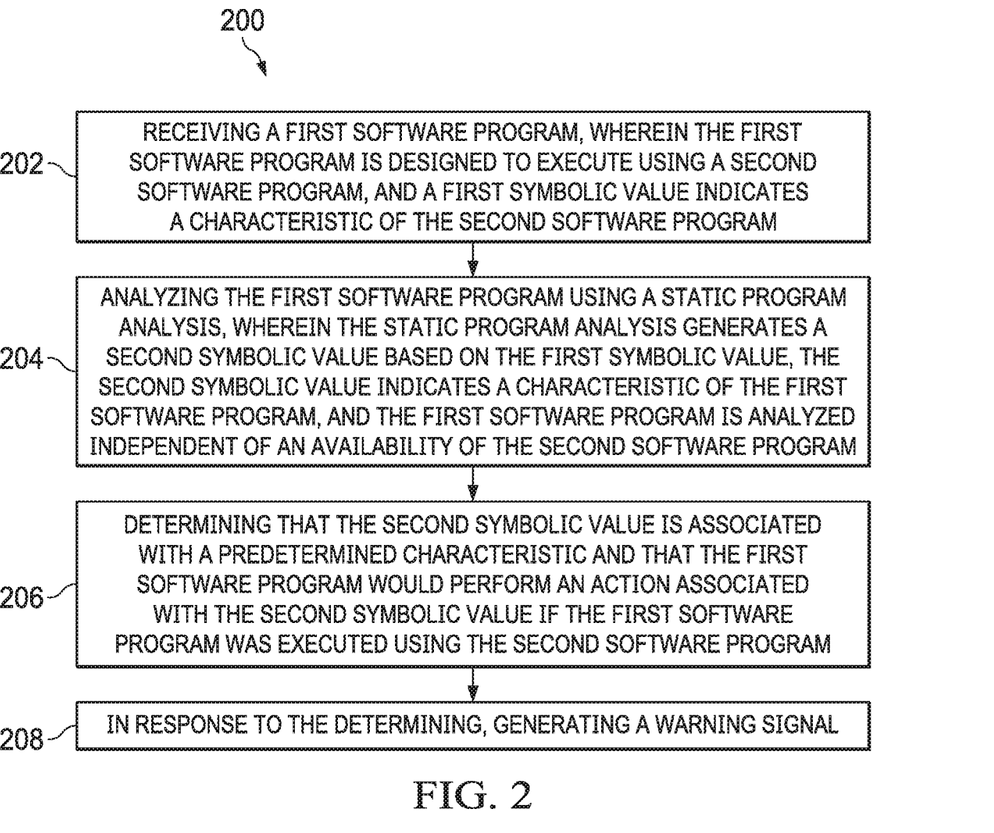
FIG. 2 is a flow diagram illustrating an example method of analyzing a partial software program, according to an implementation.

FIG. 2 is a flow diagram illustrating an example method 200 of analyzing a partial software program, according to an implementation. For clarity of presentation, the description that follows generally describes method 200 in the context of the other figures in this description. However, it will be understood that method 200 may be performed, for example, by any suitable system, environment, software, and hardware, or a combination of systems, environments, software, and hardware, as appropriate. For example, method 200 can be performed by the example computer system 300 illustrated in FIG. 3. In some implementations, various steps of method 200 can be run in parallel, in combination, in loops, or in any order.

At 202, a static program analyzer can receive a first software program. The first software program is designed to execute using a second software program. A first symbolic value can indicate a characteristic of the second software program. At 204, the static program analyzer can analyze the first software program using a static program analysis. The static program analysis can generate a second symbolic value based on the first symbolic value, and the second symbolic value can indicate behaviors of the first software program. The first software program can be analyzed independent of an availability of the second software program. At 206, the static program analyzer determines that the second symbolic value is associated with a predetermined characteristic (for example, a security flaw) and that the first software program would perform an action associated with the second symbolic value if the first software program was executed using the second software program. At 208, in response to the determining, the static program analyzer can generate a warning signal. For example, if the static program analyzer determines that the second symbolic value includes symbol names for user ID, password, and/or PII and that the first software program would export the second symbolic value to an unauthorized device or an unauthorized software program, a warning signal is generated.

Figure 3:
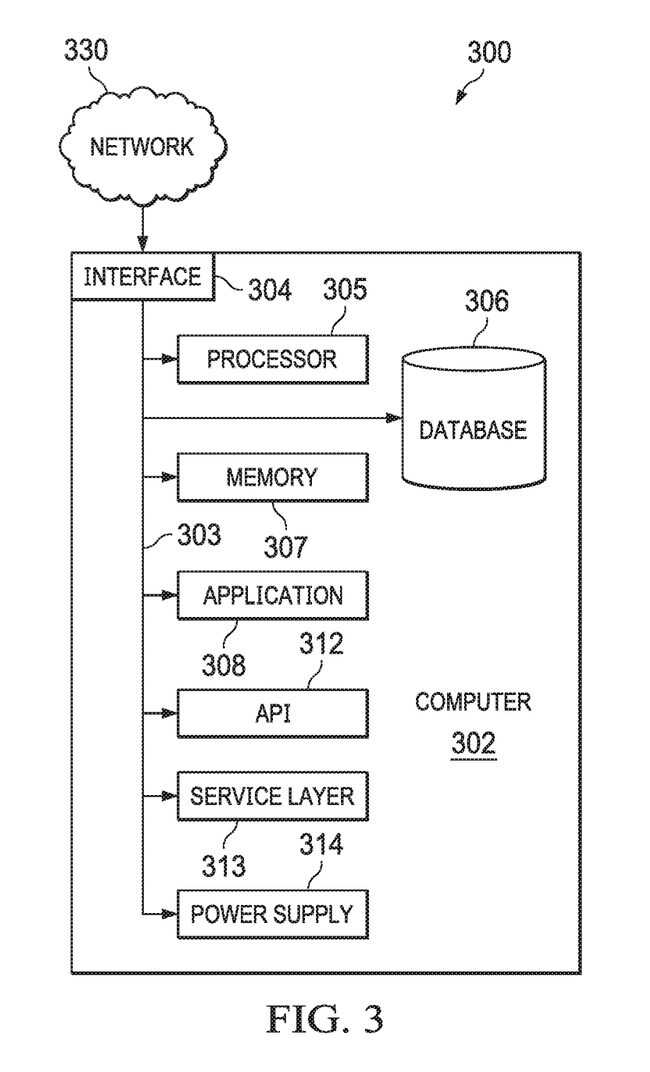
FIG. 3 is a block diagram of an example computer system used to provide computational functionalities associated with described algorithms, methods, functions, processes, flows, and procedures, as described in the instant disclosure, according to an implementation.

FIG. 3 is a block diagram of an example computer system 300 used to provide computational functionalities associated with described algorithms, methods, functions, processes, flows, and procedures, as described in the instant disclosure, according to an implementation. The illustrated computer 302 is intended to encompass any computing device such as a server, desktop computer, laptop/notebook computer, wireless data port, smart phone, personal data assistant (PDA), tablet computing device, one or more processors within these devices, or any other suitable processing device, including physical or virtual instances (or both) of the computing device. Additionally, the computer 302 may comprise a computer that includes an input device, such as a keypad, keyboard, touch screen, or other device that can accept user information, and an output device that conveys information associated with the operation of the computer 302, including digital data, visual, or audio information (or a combination of information), or a graphical-type user interface (UI) (or GUI).

The computer 302 can serve in a role as a client, network component, a server, a database or other persistency, or any other component (or a combination of roles) of a computer system for performing the subject matter described in the instant disclosure. The illustrated computer 302 is communicably coupled with a network 330. In some implementations, one or more components of the computer 302 may be configured to operate within environments, including cloud-computing-based, local, global, or other environment (or a combination of environments).

At a high level, the computer 302 is an electronic computing device operable to receive, transmit, process, store, or manage data and information associated with the described subject matter. According to some implementations, the computer 302 may also include or be communicably coupled with an application server, e-mail server, web server, caching server, streaming data server, or other server (or a combination of servers).

The computer 302 can receive requests over network 330 from a client application (for example, executing on another computer 302) and respond to the received requests by processing the received requests using an appropriate software application(s). In addition, requests may also be sent to the computer 302 from internal users (for example, from a command console or by other appropriate access method), external or third-parties, other automated applications, as well as any other appropriate entities, individuals, systems, or computers.

Each of the components of the computer 302 can communicate using a system bus 303. In some implementations, any or all of the components of the computer 302, hardware or software (or a combination of both hardware and software), may interface with each other or the interface 304 (or a combination of both), over the system bus 303 using an application programming interface (API) 312 or a service layer 313 (or a combination of the API 312 and service layer 313). The API 312 may include specifications for routines, data structures, and object classes. The API 312 may be either computer-language independent or dependent and refer to a complete interface, a single function, or even a set of APIs. The service layer 313 provides software services to the computer 302 or other components (whether or not illustrated) that are communicably coupled to the computer 302. The functionality of the computer 302 may be accessible for all service consumers using this service layer. Software services, such as those provided by the service layer 313, provide reusable, defined functionalities through a defined interface. For example, the interface may be software written in JAVA, C++, or other suitable language providing data in extensible markup language (XML) format or other suitable format. While illustrated as an integrated component of the computer 302, alternative implementations may illustrate the API 312 or the service layer 313 as stand-alone components in relation to other components of the computer 302 or other components (whether or not illustrated) that are communicably coupled to the computer 302. Moreover, any or all parts of the API 312 or the service layer 313 may be implemented as child or sub-modules of another software module, enterprise application, or hardware module without departing from the scope of this disclosure.

The computer 302 includes an interface 304. Although illustrated as a single interface 304 in FIG. 3, two or more interfaces 304 may be used according to particular needs, desires, or particular implementations of the computer 302. The interface 304 is used by the computer 302 for communicating with other systems that are connected to the network 330 (whether illustrated or not) in a distributed environment. Generally, the interface 304 comprises logic encoded in software or hardware (or a combination of software and hardware) and is operable to communicate with the network 330. More specifically, the interface 304 may comprise software supporting one or more communication protocols associated with communications such that the network 330 or interface's hardware is operable to communicate physical signals within and outside of the illustrated computer 302.

The computer 302 includes a processor 305. Although illustrated as a single processor 305 in FIG. 3, two or more processors may be used according to particular needs, desires, or particular implementations of the computer 302. Generally, the processor 305 executes instructions and manipulates data to perform the operations of the computer 302 and any algorithms, methods, functions, processes, flows, and procedures as described in the instant disclosure.

The computer 302 also includes a database 306 that can hold data for the computer 302 or other components (or a combination of both) that can be connected to the network 330 (whether illustrated or not). For example, database 306 can be an in-memory, conventional, or other type of database storing data consistent with this disclosure. In some implementations, database 306 can be a combination of two or more different database types (for example, a hybrid in-memory and conventional database) according to particular needs, desires, or particular implementations of the computer 302 and the described functionality. Although illustrated as a single database 306 in FIG. 3, two or more databases (of the same or combination of types) can be used according to particular needs, desires, or particular implementations of the computer 302 and the described functionality. While database 306 is illustrated as an integral component of the computer 302, in alternative implementations, database 306 can be external to the computer 302.

The computer 302 also includes a memory 307 that can hold data for the computer 302 or other components (or a combination of both) that can be connected to the network 330 (whether illustrated or not). Memory 307 can store any data consistent with this disclosure. In some implementations, memory 307 can be a combination of two or more different types of memory (for example, a combination of semiconductor and magnetic storage) according to particular needs, desires, or particular implementations of the computer 302 and the described functionality. Although illustrated as a single memory 307 in FIG. 3, two or more memories 307 (of the same or combination of types) can be used according to particular needs, desires, or particular implementations of the computer 302 and the described functionality. While memory 307 is illustrated as an integral component of the computer 302, in alternative implementations, memory 307 can be external to the computer 302.

The application 308 is an algorithmic software engine providing functionality according to particular needs, desires, or particular implementations of the computer 302, particularly with respect to functionality described in this disclosure. For example, application 308 can serve as one or more components, modules, or applications. Further, although illustrated as a single application 308, the application 308 may be implemented as multiple applications 308 on the computer 302. In addition, although illustrated as integral to the computer 302, in alternative implementations, the application 308 can be external to the computer 302.

The computer 302 can also include a power supply 314. The power supply 314 can include a rechargeable or non-rechargeable battery that can be configured to be either user- or non-user-replaceable. In some implementations, the power supply 314 can include power-conversion or management circuits (including recharging, standby, or other power management functionality). In some implementations, the power-supply 314 can include a power plug to allow the computer 302 to be plugged into a wall socket or other power source to, for example, power the computer 302 or recharge a rechargeable battery.

There may be any number of computers 302 associated with, or external to, a computer system containing computer 302, each computer 302 communicating over network 330. Further, the term "client," "user," and other appropriate terminology may be used interchangeably, as appropriate, without departing from the scope of this disclosure. Moreover, this disclosure contemplates that many users may use one computer 302, or that one user may use multiple computers 302.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., or less than 5 secs. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data includes all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital video disc (DVD), CD-ROM, DVD+/−R, DVD-RAM, DVD-ROM, HD-DVD, and BLURAY, and other optical memory technologies. The memory may store various objects or data, including caches, classes, frameworks, applications, modules, backup data, jobs, web pages, web page templates, data structures, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A method, comprising: receiving, by a hardware processor, a first software program, wherein the first software program is designed to execute using a second software program, wherein the first software program comprises a first symbolic value indicating a characteristic of the second software program, the first symbolic value indicating a parameter that the first software program requests from the second software program;

Analyzing, by the hardware processor, the first software program using a static program analysis, wherein the analyzing the first software program using the static program analysis comprises:

Determining whether a concrete value exists for the parameter that the first software program requests from the second software program; and in response to determining that no concrete value exists for the parameter that the first software program requests from the second software program, generating a second symbolic value based on the first symbolic value, the second symbolic value indicating a characteristic of the first software program, wherein the first software program is analyzed independent of an availability of the second software program;

wherein the static program analysis generates a plurality of threads, each of the plurality of thread corresponding to a conditional branch of the first software program, wherein the plurality of threads are executed separately by the static program analysis;

determining, by the hardware processor, that the second symbolic value is associated with a predetermined characteristic indicating private data associated with a security policy and determining that an action associated with the second symbolic value resulting from executing the first software program using the second software program would be a violation of the security policy, wherein the action is exporting the second symbolic value from the first software program to an unauthorized entity;

In response to the determining, generating, by the hardware processor, a warning signal; and sending the warning signal to a user interface.

2. The method of claim 1, wherein the first software program is in a machine language format.

3. The method of claim 1, wherein the first software program comprises an application, and the second software program comprises at least a portion of an operating system.

4. The method of claim 1, wherein the first software program is associated with a register, and the second symbolic value is stored in the register.

5. The method of claim 1, wherein the action is exporting the second symbolic value in the register to an entity different than the first software program.

6. The method of claim 1, wherein analyzing the first software program comprises updating the second symbolic value, and the method further comprises continuing a thread until the updating stops.

7. The method of claim 1, wherein the static program analysis includes a symbolic computation and a concrete computation.

8. The method of claim 1, wherein the predetermined characteristic is a security characteristic.

9. A device, comprising:
A memory; and
At least one hardware processor communicatively coupled with the memory and configured to:
receive a first software program, wherein the first software program is designed to execute using a second software program, wherein the first software program comprises a first symbolic value indicating a characteristic of the second software program, the first symbolic value indicating a parameter that the first software program requests from the second software program;
Analyze the first software program using a static program analysis, wherein the analyzing the first software program using the static program analysis comprises;
Determining whether a concrete value exists for the parameter that the first software program requests from the second software program; and
in response to determining that no concrete value exists for the parameter that the first software program requests from the second software program, generating a second symbolic value based on the first symbolic value, the second symbolic value indicating a characteristic of the first software program, wherein the first software program is analyzed independent of an availability of the second software program;
wherein the static program analysis generates a plurality of threads, each of the plurality of thread corresponding to a conditional branch of the first software program, wherein the plurality of threads are executed separately by the static program analysis;
determine that the second symbolic value is associated with a predetermined characteristic indicating private data associated with a security policy and determining that an action associated with the second symbolic value resulting from executing the first software program using the second software program would be a violation of the security policy, wherein the action is exporting the second symbolic value from the first software program to an unauthorized entity; in response to the determining, generate a warning signal; send the warning signal to a user interface.

10. The device of claim 9, wherein the first software program comprises an application, and the second software program comprises at least a portion of an operating system.

11. The device of claim 9, wherein the first software program is associated with a register, and the second symbolic value is stored in the register.

12. The device of claim 11, wherein the action is exporting the second symbolic value in the register to an entity different from the first software program.

13. The device of claim 9, wherein analyzing the first software program comprises updating the second symbolic value, and wherein analyzing the first software program further comprises continuing a thread until the updating stops.

14. The device of claim 9, wherein the static program analysis includes a symbolic computation and a concrete computation.

15. The device of claim 9, wherein the predetermined characteristic is a security characteristic.

16. A non-transitory computer-readable medium containing instructions which, when executed, cause a computing device to perform operations comprising:
receiving a first software program, wherein the first software program is designed to execute using a second software program, wherein the first software program comprises a first symbolic value indicating a characteristic of the second software program, the first symbolic value indicating a parameter that the first software program requests from the second software program;
Analyzing the first software program using a static program analysis, wherein the analyzing the first software program using the static program analysis comprises:
determining whether a concrete value exists for the parameter that the first software program requests from the second software program; and
in response to determining that no concrete value exists for the parameter that the first software program requests from the second software program, generating a second symbolic value based on the first symbolic value, the second symbolic value indicating a characteristic of the first software program, wherein the first software program is analyzed independent of an availability of the second software program;
wherein the static program analysis generates a plurality of threads, each of the plurality of thread corresponding to a conditional branch of the first software program, wherein the plurality of threads are executed separately by the static program analysis;
determining that the second symbolic value is associated with a predetermined characteristic indicating private data associated with a security policy and determining that an action associated with the second symbolic value resulting from executing the first software program using the second software program would be a violation of the security policy, wherein the action is exporting the second symbolic value from the first software program to an unauthorized entity; in response to the determining, generating a warning signal; and sending the warning signal to a user interface.

17. The non-transitory computer-readable medium of claim 16, wherein the first software program comprises an application, and the second software program comprises at least a portion of an operating system.

18. The non-transitory computer-readable medium of claim 16, wherein the static program analysis includes a symbolic computation and a concrete computation.

* * * * *